No. 872,656.
PATENTED DEC. 3, 1907.
M. H. JOHNSON.
ELECTRICALLY HEATED CAN CAPPING MACHINE.
APPLICATION FILED APR. 5, 1907.
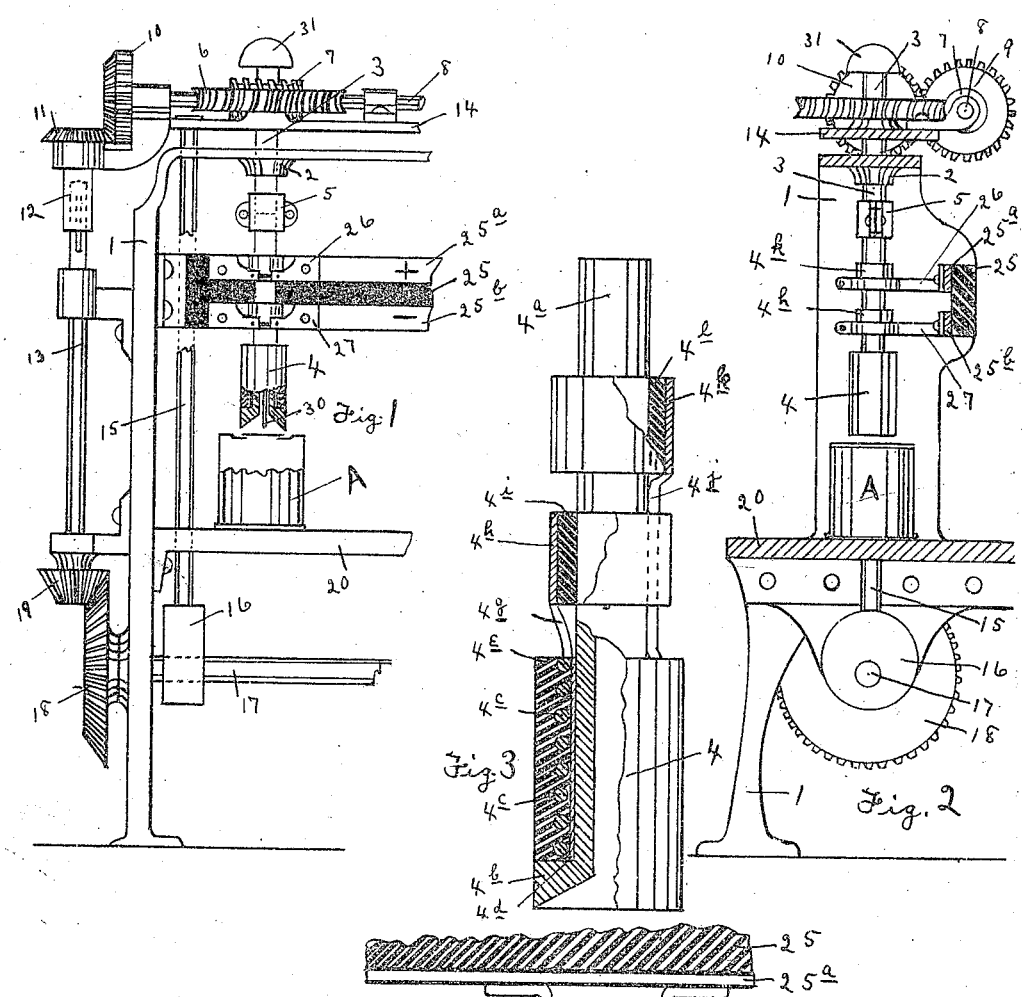
WITNESSES
Geo. E. Rendell
E. S. Hesser
INVENTOR
Montgomery H. Johnson
BY
Robinson, Martin & Jones
ATTORNEYS

UNITED STATES PATENT OFFICE.

MONTGOMERY H. JOHNSON, OF UTICA, NEW YORK.

ELECTRICALLY-HEATED CAN-CAPPING MACHINE.

No. 872,656.

Specification of Letters Patent.

Patented Dec. 3, 1907.

Application filed April 5, 1907. Serial No. 366,495.

*To all whom it may concern:*

Be it known that I, MONTGOMERY H. JOHNSON, of Utica, in the county of Oneida and State of New York, have invented certain new and useful Improvements in Electrically-Heated Can-Capping Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide improvements in can capping machines wherein or whereby provision is more particularly made for utilizing electricity for heating the soldering irons and for conveying the current to the several irons while providing for their several movements in the course of their operations. Also in regulating the degree of heat of the irons.

Figure 1 shows a partial side elevation of a machine embodying features of my improvements. Fig. 2 shows a sectional view of the same. Fig. 3 is an enlarged detail view of the soldering iron, and its appurtenances. Fig. 4 is an enlarged detail view of the connection between the current carrying conductors on the stationary part of the machine and the current carrying devices on the soldering iron portion.

Referring to the reference letters and figures in a more particular description, 1 indicates the frame of the machine which carries in bearings 2 arranged at the top of the machine vertical shafts 3 on which the soldering iron 4 is mounted, and to which it is secured by means of a clamping sleeve 5.

In the form of construction shown in the drawings the soldering iron is given a rotary motion. The mechanism for giving this rotary motion consists of a worm wheel 6 provided on the upper end of the shaft 3 which is engaged by a rotary worm 7 provided on the shaft 8. The shaft 8 is driven by means of the gear pinions 9 and 10, the latter including a beveled portion engaging with the beveled gear pinion 11 mounted on a vertically sliding sleeve 12 engaging with the upper end of shaft 13. The shaft 8 and the sleeve 12 are carried in bearings on a vertically movable bar 14 on which bar the shaft 3 also has a bearing. The worm wheel 6 rests on the upper end of the bearing. By raising and lowering the bar 14 the irons 4 may be lifted off from the tops of the cans or lowered on to the cans. For raising the bar 14 there is provided a push rod 15 extending into the lower portion of the frame 1 where it engages with the cam 16 provided on the main shaft 17. The shaft 17 is a driven shaft and drives the shaft 13 through the medium of the beveled gears 18 and 19. When being operated upon the cans A are supported on the table 20 in the machine, and the machines are ordinarily arranged to take a number of these cans simultaneously say 10 or 12 at a time.

The soldering iron proper consists of a hollow shaft or spindle portion $4^a$ having an enlarged disk end $4^b$ which is counter-sunk in the end to provide the usual annular soldering tip or face. Encircling the spindle portion $4^a$ adjacent to the part $4^b$ are convolutions of the heating coil $4^c$, which coil is formed of spaced convolutions of steel wire having a high temperature coefficient. The convolutions of the coil $4^c$ are separated from the spindle $4^a$ and the part $4^b$ by a thin layer $4^d$ of a peculiar insulator consisting of asbestos soaked in sodium silicate solution (water glass) and dried. The convolutions are also inclosed in and embedded in a covering $4^e$, which is also an insulator consisting of a paste formed by the mixture of powdered pumice stone and solution of sodium silicate. This paste when applied and dried attaches itself so securely to the heating coil and is of sufficient elasticity to maintain its adherence even when the coil is frequently heated by the application of a current of electricity and subsequently cooked. This covering together with the arrangement of parts is such that heat from the coil is effectively transmitted to the soldering iron and loss from radiation reduced to a minimum. One end of the coil $4^c$ indicated by $4^g$ is attached to a collector ring $4^h$ surrounding the spindle $4^a$ and insulated therefrom by insulating ring $4^i$. The other end of the coil $4^c$ indicated by $4^j$ is attached to collector ring $4^k$ surrounding the spindle $4^a$ at another point and insulated therefrom by an insulated bushing or collar $4^l$.

Mounted in the frame of the machine there is provided a bar 25 preferably of insulating material (dry wood will do) on the face of which are secured two conductor strips 25$^a$ and 25$^b$. These strips respectively take positions substantially opposite the collector rings 4$^h$ and 4$^k$ when the irons are mounted in the machine. At each iron these conductors 25$^a$ and 25$^b$ are respectively provided with a pair of spring flexible clamping connections 26 and 27, the base ends of which are electrically connected to the conductors 25$^a$ and 25$^b$, respectively, and the outstanding ends of which are formed into curved portions $a$, which more or less encircle and engage the respective collector rings 4$^k$ and 4$^h$ and may be provided with ears in which is mounted a binding or clamping bolt $b$.

When the irons are dropped on to the cans to perform their soldering operation the can may be more or less out of its exact intended position, which requires the iron to be mounted loose enough in its bearings to allow it to swing more or less until it finds its proper bearing on the can. The clamp conductors 26 and 27 allow the iron to swing around within certain limits without interfering with their efficiency in carrying current to the heating coil. The conductors 25$^a$ and 25$^b$ will be connected by suitable cables or otherwise with a dynamo or other suitable source of electric energy. The conductors 25$^a$ and 25$^b$ will be extended longitudinal of the machine a sufficient distance to accommodate the full number of soldering irons which a machine is designed to handle.

The width of the collector rings 4$^h$ and 4$^k$ is sufficient to provide for the rising and falling movement of the soldering irons without allowing these rings to become disengaged from the conductors 26 and 27, and the arrangement is also such as to allow the irons to be rotated while maintaining a perfect electrical connection.

Extending through the hollow shaft 3 and the spindle of the soldering iron is the usual push rod 30 provided with a weight 31 at its upper end and serving to hold down the cap of the can when the soldering iron is being withdrawn or lifted.

The operation of the ordinary can capping machine is so well understood that a specific description of the operation of this device may be omitted. It may, however, be stated that a particular advantage of this construction is that the heating coil is so effectively placed and secured with reference to the body of the iron that the heat is effectively and satisfactorily transmitted, and also the irons are to a large extent self-regulating as to their heat, for as the heating coil becomes hot its current carrying capacity is correspondingly decreased retarding the flow of the current and vice versa as the coil decreases in temperature the current carrying capacity increases, and the total amount of effective heat produced is correspondingly increased. This is quite an important feature in a machine carrying a number of soldering irons all on the same circuit. Heretofore great difficulty has been experienced in employing for a heating coil a conductor which effectively reduced the quantity of the flow of the current as it increased in temperature, and vice versa, and in maintaining the insulation and close adhesion between the coil and the soldering iron which is necessary to effect a satisfactory transmission of the heat from the coil to the iron. By the method of construction which is herein employed and the use of the materials herein specified a most satisfactory construction in this behalf has been produced.

It will be noted that while the soldering iron herein shown and described is particularly adapted for use in such machines as require the soldering iron to be raised and lowered, and also rotated, the iron can be likewise readily used in that class of machines wherein the iron is simply raised and lowered while the can is rotated, or even in a class of machine where the iron has no vertical or rotary movement.

What I claim as new and desire to secure by Letters Patent is:

1. The combination in a can capping machine of a soldering iron having an electric heating coil embodied therein, collector rings surrounding the shank of the soldering iron to which ends of the coil are respectively connected, means on the machine for making contact with said collector rings and means for rotating and raising and lowering the iron, substantially as set forth.

2. A soldering iron for a can capping machine consisting of a general cylindrical body, an electric heating coil encircling a portion of the body, insulated collector rings encircling at different points the said body and connected with the ends of the coil, respectively, substantially as set forth.

3. A can capping machine having means for rotating and raising and lowering the soldering irons, and stationary electric current conductors of a soldering iron adapted to be mounted in said machine consisting of a general cylindrical body having a heating coil mounted on one portion of the body, insulated collector rings mounted on and surrounding other portions of the body and connected with the ends of the heating coil, respectively, said rings being, respectively, of a width greater than the distance that the irons are arranged to move vertically, and a connector mounted on the machine and engaging with said collector rings, respectively, substantially as set forth.

4. A soldering iron consisting of a body and a heating coil arranged in close proximity to the surface of the body and embedded in a composition of sodium silicate and pumice stone, substantially as set forth.

In witness whereof, I have affixed my signature, in presence of two witnesses, this 25th day of March 1907.

MONTGOMERY H. JOHNSON.

Witnesses:
GEO. E. RENDELL,
E. S. HESSE.